United States Patent
Mecklinger

(10) Patent No.: US 9,707,879 B2
(45) Date of Patent: Jul. 18, 2017

(54) DEVICE AND METHOD FOR TRANSPORTING HEAVY DUTY RACKS BY MEANS OF A TRANSPORT VEHICLE ON AN UNEVEN GROUND SURFACE

(71) Applicant: GRENZEBACH MASCHINENBAU GMBH, Asbach-Baeumenheim (DE)

(72) Inventor: Siegfried Mecklinger, Buchdorf (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 0 days.

(21) Appl. No.: 14/906,478

(22) PCT Filed: Aug. 11, 2014

(86) PCT No.: PCT/DE2014/000409
§ 371 (c)(1),
(2) Date: Jan. 20, 2016

(87) PCT Pub. No.: WO2015/021958
PCT Pub. Date: Feb. 19, 2015

(65) Prior Publication Data
US 2016/0167557 A1    Jun. 16, 2016

(30) Foreign Application Priority Data
Aug. 12, 2013    (DE) .......................... 10 2013 013 438

(51) Int. Cl.
*B60P 1/02*    (2006.01)
*B66F 9/06*    (2006.01)
(Continued)

(52) U.S. Cl.
CPC ........ *B60P 1/02* (2013.01); *B60P 3/00* (2013.01); *B66F 9/063* (2013.01); *B66F 9/065* (2013.01)

(58) Field of Classification Search
CPC .......... B66F 9/061; B66F 9/063; B66F 9/065; B60P 1/02; B60P 3/00
(Continued)

(56) References Cited

U.S. PATENT DOCUMENTS 4,496,274 A     1/1985  Pipes
4,861,220 A *   8/1989  Smith .................. B23Q 7/1442
                                                        414/401

(Continued)

FOREIGN PATENT DOCUMENTS

DE    202011003469          6/2011
DE    202013007279 U1  *  11/2013   .............. B66F 9/065
(Continued)

*Primary Examiner* — Kaitlin Joerger
(74) *Attorney, Agent, or Firm* — Duane Morris LLP; J. Rodman Steele, Jr.; Gregory M. Lefkowitz

(57) ABSTRACT

The invention relates to a device and to a method for transporting heavy duty racks on an uneven ground surface by means of a transport vehicle, comprising the following features: a) a housing (3) having a carrier plate (1) for transporting a heavy duty rack (12), having two separately powered drive wheels (20) hinged to a respective axis of rotation (5) on both sides in the center of the housing (3), having at least one stabilizing wheel (9) in the front and at least one stabilizing wheel (21) in the back; b) a transverse control arm (34), which connects the drive wheels (20), which respectively can be pivoted about the axis of rotation (5) by means of an angle lever (40) such that they are able to carry out vertical movements independently from one another; c) a centrally arranged actuating element (31), which can move two front lift rods (19) and two rear lift rods (16) by means of a lifting rotary lever (27) and of a push rod (24) connected thereto, for raising and lowering the carrier plate (1); d) a system for supplying a transport vehicle with energy.

10 Claims, 6 Drawing Sheets

Figure 1:
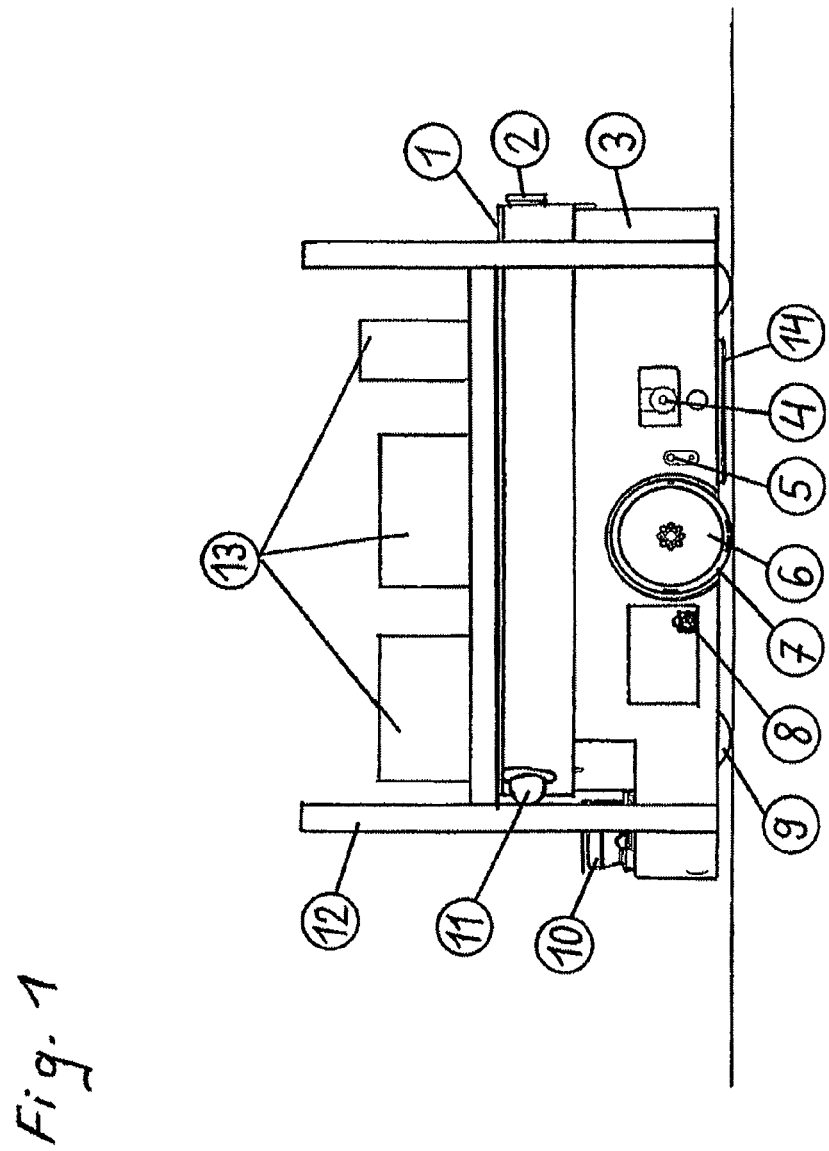

(51) Int. Cl.
 *B66F 9/065* (2006.01)
 *B60P 3/00* (2006.01)

(58) Field of Classification Search
 USPC .......................................................... 414/340
 See application file for complete search history.

(56) References Cited

U.S. PATENT DOCUMENTS

| | | | | |
|---|---|---|---|---|
| 5,316,100 | A * | 5/1994 | Juan | B62D 1/24 |
| | | | | 180/167 |
| 5,344,276 | A * | 9/1994 | Juan | B66F 9/063 |
| | | | | 104/88.01 |
| 5,451,133 | A * | 9/1995 | Salsburg | B23Q 7/1436 |
| | | | | 414/396 |
| 7,826,919 | B2 * | 11/2010 | D'Andrea | B66F 9/063 |
| | | | | 700/214 |
| 7,850,413 | B2 * | 12/2010 | Fontana | B66F 3/08 |
| | | | | 414/331.14 |
| 7,905,304 | B2 * | 3/2011 | Adachi | B66F 9/063 |
| | | | | 180/12 |
| 9,315,367 | B2 * | 4/2016 | Ooga | B66F 9/063 |
| 9,436,184 | B2 * | 9/2016 | D'Andrea | B66F 9/063 |
| 2007/0288123 | A1 | 12/2007 | D'Andrea et al. | |
| 2014/0361501 | A1 * | 12/2014 | Lin | B66F 9/063 |
| | | | | 280/5.506 |
| 2016/0167557 | A1 * | 6/2016 | Mecklinger | B66F 9/063 |
| | | | | 414/495 |

FOREIGN PATENT DOCUMENTS

| | | | | |
|---|---|---|---|---|
| DE | 202013011145 U1 * | 1/2014 | | B66F 9/063 |
| EP | 1621440 | 2/2006 | | |
| JP | S61177037 | 8/1986 | | |
| JP | 2009107813 | 5/2009 | | |
| TW | 474885 | 2/2002 | | |
| WO | 2008/068264 | 6/2008 | | |

* cited by examiner

DEVICE AND METHOD FOR TRANSPORTING HEAVY DUTY RACKS BY MEANS OF A TRANSPORT VEHICLE ON AN UNEVEN GROUND SURFACE

CROSS-REFERENCE TO RELATED APPLICATIONS

This application is a §371 national stage entry of International Application No. PCT/DE2014/000409, filed Aug. 11, 2014, which claims priority to German Patent Application No. 10 2013 013 438.2, filed Aug. 12, 2013, the entire contents of which are incorporated herein by reference.

The present invention relates to a method and a device for transporting heavy duty racks by means of a self-sufficient transport vehicle.

In a large number of business areas, for example trade in foodstuffs and household goods or industry and household products, goods are provided in unmixed source pallets containing identical bundles in heavy duty racks. Here, a bundle may be constituted by a packaged or unpackaged unit load or by a compilation of goods, such as a case, a box or a crate containing bulk material or a plurality of individual goods, such as drinks bottles or dairy products. A group of horizontally arranged bundles is referred to as a bundle layer. A number of a plurality of bundle layers stacked vertically on top of one another is by contrast referred to as a pallet, generally in conjunction with an appropriate carrier system, usually in the form of a stable wood structure. What is known as an unmixed bundle layer or pallet contains only bundles of the same sort or type.

In order to compile a delivery to a certain customer, pallets must be compiled herefrom which are loaded differently with certain bundle layers or bundles. If this is a pallet having different, and in each case unmixed layers, this is referred to as a pallet having unmixed layers or a rainbow pallet. Bundles layered vertically one above the other are referred to as stacks. If a certain pallet constitutes a delivery in which layered, stacked or mixed compilations of different bundles are required, reference is made to a mixed pallet.

A method and a device for commissioning goods, a storage management system, and the use of at least one self-sufficient transport vehicle are known from the prior art from WO 2008/068264 A1. The aforementioned document fundamentally claims the loading of a self-sufficient transport vehicle, the automatic transportation of required palletizing units by means of a self-sufficient transport vehicle, and the sequential unloading of the palletizing units by means of a palletizing robot in accordance with a previously determined packing pattern. In accordance with the further information provided, the required bundle layers are held available in a high-level rack.

The cooperation of the previously claimed components during the loading of a mixed pallet is described in essence in the storage management system as claimed herein.

The use of a self-sufficient transport vehicle is also claimed.

DE 20 2011 003 469 U1 describes a device for the defined temporary storage and commissioning of produced goods of identical type, but different size.

This device has a multiplicity of transport vehicles for transporting stack mounts, wherein the transport vehicles are moved and controlled by means of a plurality of induction lines for power supply and control.

The object of the present invention is to create a self-sufficient transport vehicle with which the rapid transport of loaded goods can be performed safely, even with an uneven ground surface and with slight gradients.

This object is achieved by the device according to claim 1: A device for transporting heavy duty racks on an uneven ground surface by means of a transport vehicle, comprising the following features:
  a) a housing (3) having a carrier plate (1) for carrying and transporting a heavy duty rack (12), having two separately driven drive wheels (20) each hinged to a separate axis of rotation (5), one on each of the two sides in the center of the housing (3), and having at least one stabilizing wheel (9) at the front, and having at least one stabilizing wheel (21) at the rear,
  b) a transverse control arm (34), which connects the drive wheels (20), which each can be pivoted about the axis of rotation (5) by means of an angle lever (40), such that they are able to carry out vertical movements independently of one another,
  c) a centrally arranged actuating element (31), which can move two front lift rods (19) and two rear lift rods (16) by means of a lifting rotary lever (27) and a push rod (24) connected thereto, for raising or lowering the carrier plate (1),
  d) a system for supplying energy to a transport vehicle either via inductive lines laid in the ground or via stationary energy supply stations which can be driven up to,
  e) a control system for controlling and moving a transport vehicle within the scope of a load transportation program.

claim 2: The device as claimed in claim 1,
  characterized in that
  the front lift rods (19) each have an actuating element (18) and the rear lift rods (16) each have an actuating element (17) for separate height adjustment.

claim 3: The device as claimed in one of the preceding claims,
  characterized in that
  the center of gravity of the heavy duty rack (12) is detected by means of sensors, and the result of such a center of gravity determination is used in order to control the actuating elements (17) and (18).

claim 4: The device as claimed in one of the preceding claims,
  characterized in that
  sensors (42) for detecting the rotary movement of the drive wheels (20) are provided and can also determine the slip at each drive wheel (20) depending on the speed of the transport vehicle.

claim 5: The device as claimed in one of the preceding claims,
  characterized in that
  the inclination of a heavy duty rack (12) is determined by means of an inclination sensor.
  and the method according to claim 6: A method for transporting heavy duty racks on an uneven ground surface by means of a transport vehicle, said method having the following features:
  a) a transport vehicle travels beneath a rack system (12) to be transported and vertically lifts this by means of an actuating element (31) and the push rods (19) and (16), moved directly vertically upwardly as a result of this movement, by means of the carrier plate (1), to such an extent that the feet of the heavy duty rack (12) do not contact the ground surface during the transportation, even if the ground is uneven, and moves to the target location, b) unevennesses in the ground are compensated for during the transportation to the target location by means of the individually driven drive wheels (20) and the possibility for movement thereof about a decentrally arranged axis of rotation (5), and also the combined movement thereof via the respective angle lever (40) with a transverse control arm (34), such that the transport vehicle is subjected only to minor fluctuations, c) in the event of gradients the inclined position of the heavy duty rack is determined by means of an inclination sensor, and the horizontal position of the carrier plate (1) is corrected as necessary by means of actuating elements (17) and (18), d) upon arrival at the target location the heavy duty rack (12) is set down at the desired location by means of the lowered push rods (19) and (16).

claim 7: The method as claimed in claim 7,
characterized in that
the center of gravity of the heavy duty rack (12) is detected by means of sensors, and the result of such a center of gravity determination is used to control the actuating elements (17) and (18), and in that the inclination of a heavy duty rack (12) is determined by means of an inclination sensor.

claim 8: The method as claimed in claim 6 or 7,
characterized in that
sensors (42) for detecting the rotary movement of the drive wheels (20) are provided and can also determine the slip at each drive wheel (20) depending on the speed of the transport vehicle.

claim 9: A computer program having a program code for carrying out the method steps as claimed in one of claims 6 to 8 when the program is executed in a computer.

claim 10: A machine-readable carrier containing the program code of a computer program for carrying out the method as claimed in one of claims 6 to 8 when the program is executed in a computer.

The device according to the invention will be described hereinafter in greater detail.

Figure 2:
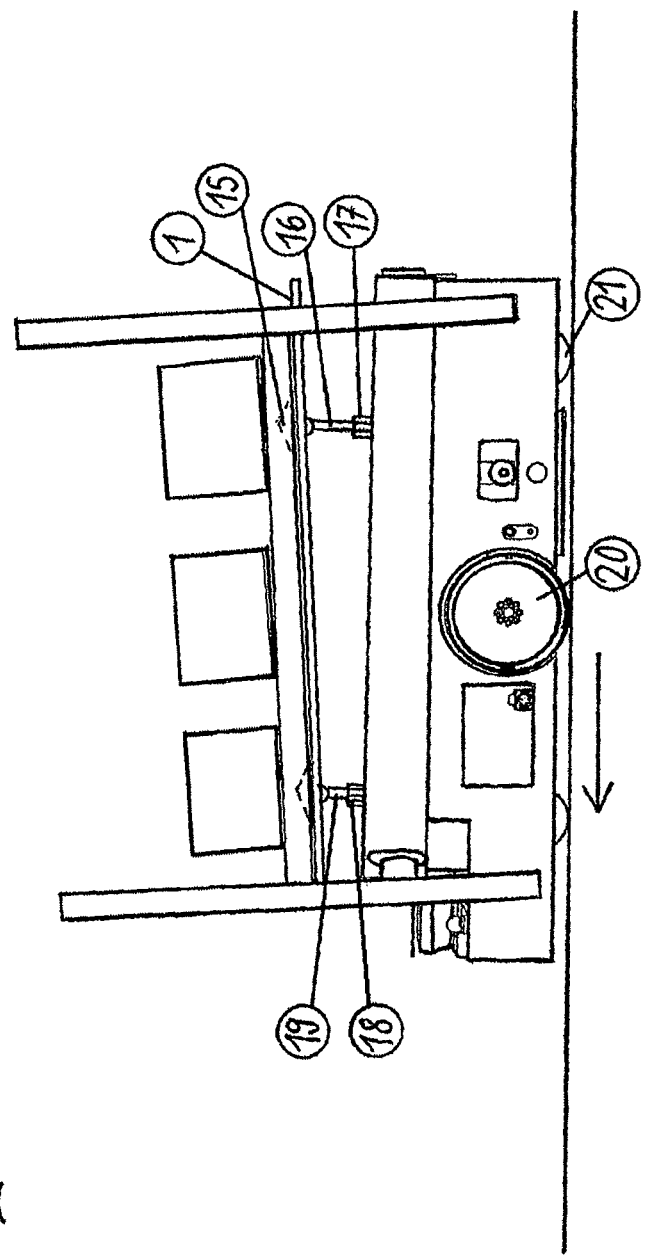
Figure 3:
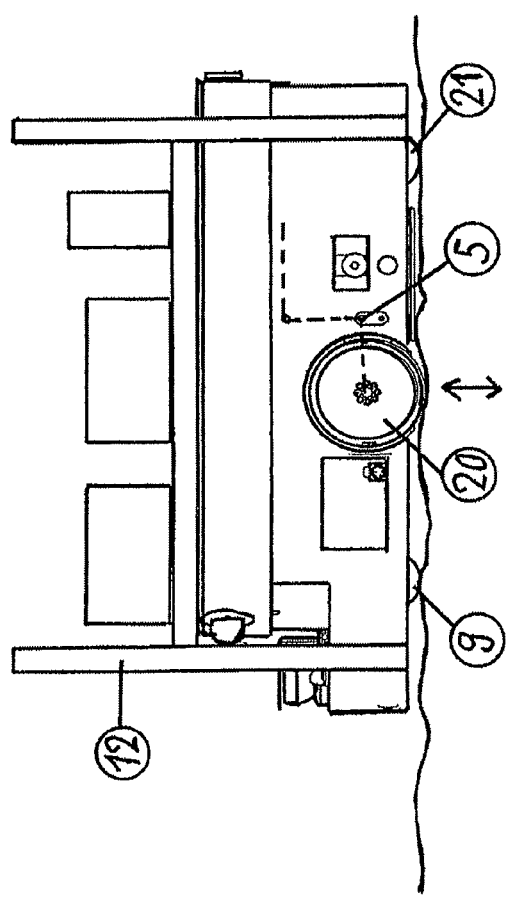
Figure 4:
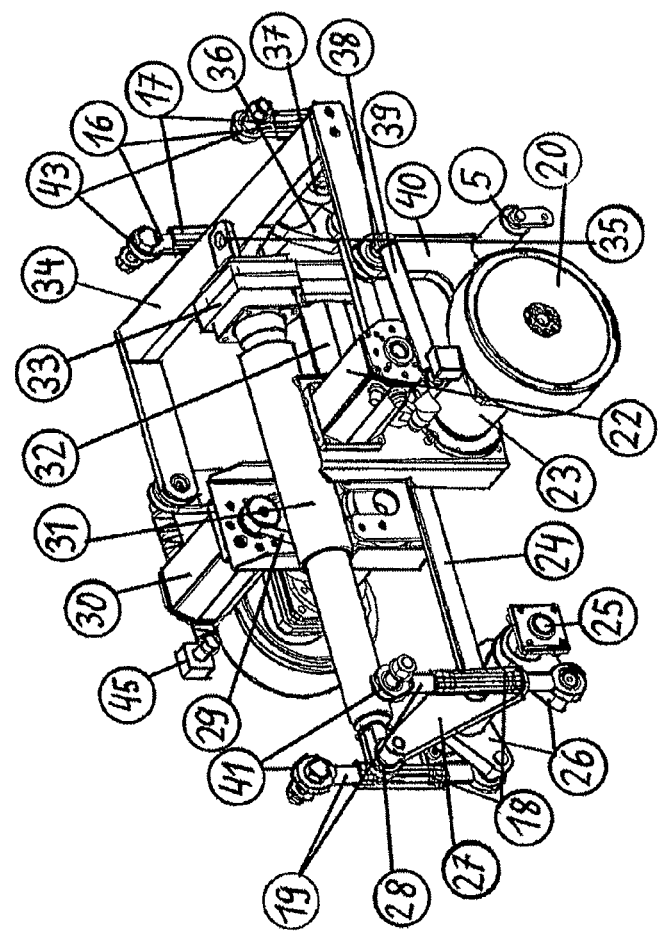
Figure 5A:
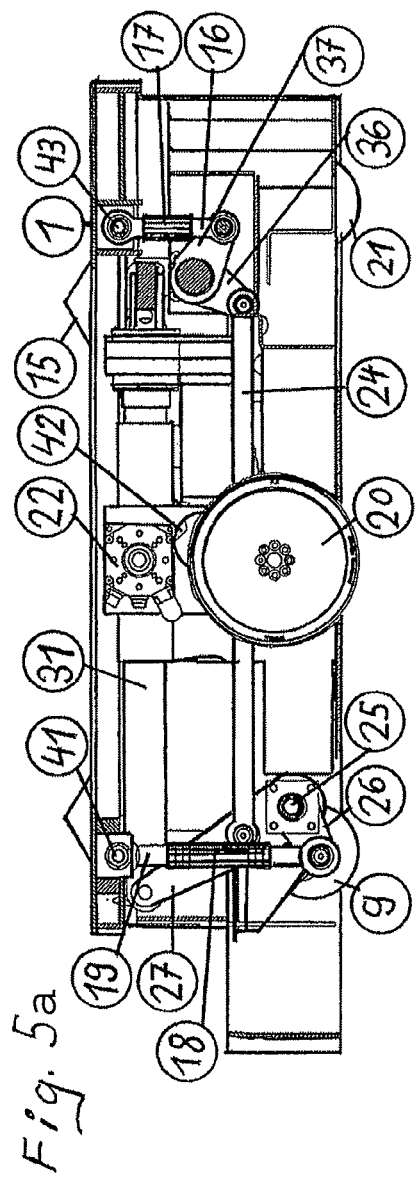
Figure 5B:
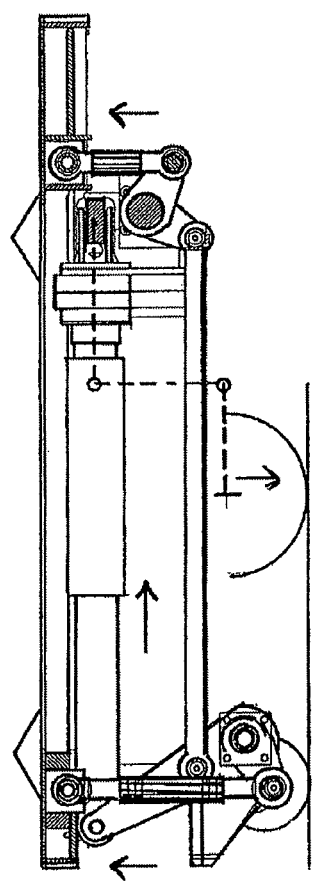
Figure 6:
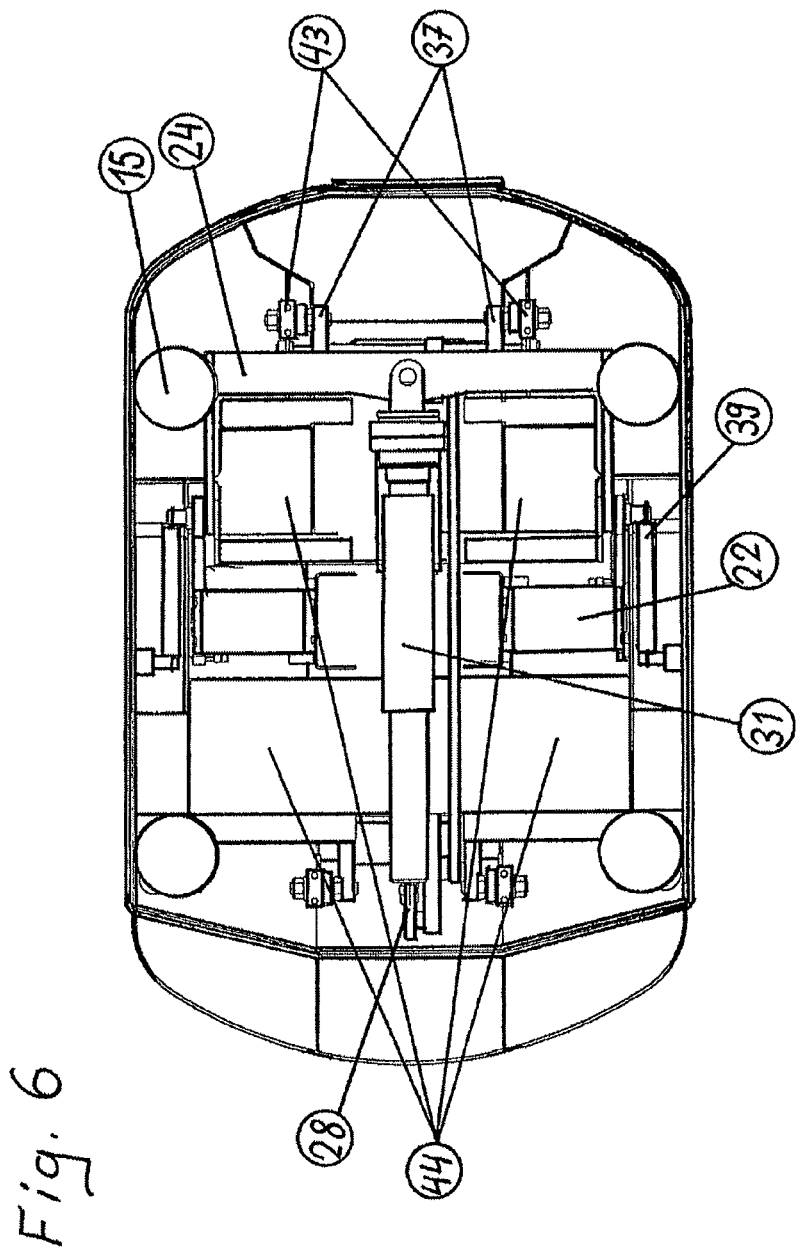

More specifically:

FIG. 1: shows a side view of a transport vehicle according to the invention;

FIG. 2: shows a side view of the transport vehicle when travelling at an incline;

FIG. 3: shows a side view of the transport vehicle with unevenesses in the ground;

FIG. 4: shows a three-dimensional detailed view of the kinematics of the transport vehicle;

FIG. 5a: shows a side view of the illustration in FIG. 4 in which the transport vehicle is shown with the housing in a side view;

FIG. 5b: shows a side view of the illustration in FIG. 4 in which the transport vehicle is shown without the housing in a side view;

FIG. 6: shows a plan view of the transport vehicle.

FIG. 1 shows a side view of a transport vehicle according to the invention. In this view reference sign designates the carrier plate of the transport vehicle, which not only constitutes the support surface for the shown heavy duty rack 12, but also has a function as a lift plate, as will be explained in greater detail hereinafter.

The housing 3 surrounding the transport vehicle has, in this view, a display 2 shown from the side. This display 2 can provide information concerning the type and compilation of the load located on the heavy duty rack, and also concerning the storage space from which the loaded goods have been fetched, and concerning the target location to which said goods will be transported. The state of charge of the batteries or energy stores driving the transport vehicle can also be displayed in the display 2.

The shown control element 4 is provided in order to give manual access from outside for the operation of the transport vehicle. In the normal case an emergency stop of the transport vehicle can be provided here. However, a number of control possibilities for manual interventions, forming a group of control elements, can also be provided within the scope of this control element 4.

In the shown view a drive wheel 6 in the direction of travel is also shown and corresponds to a further drive wheel 6 on the other, opposite side. The front of the transport vehicle is located on the left side in FIG. 1. Besides the drive wheel 6, a bearing point characterizing the position of an axis of rotation 5 is also illustrated in this view. The axis of rotation of the drive wheel 6 can pivot about this axis of rotation 5 by means of an angle lever, which is hidden by the housing in this view. It is thus ensured that, in the event of a transverse inclination of the transport vehicle caused by unevennesses in the ground, the drive wheel 6 maintains contact with the running surface of the ground. The covering 7 of the drive wheel 6 is designated by reference sign 7 and is designed such that it ensures maximum friction on the running surface of the ground.

The plug connection 8 shown beside the drive wheel 6 enables the charging of the energy stores driving the drive system of the transport vehicle. These energy stores may be electric batteries, liquid gas stores or other energy stores.

In order to support the transport vehicle, stabilizing wheels are used, of which the front stabilizing wheel is designated in this illustration by reference sign 9.

A commercially available 3D scanner is installed on the front of the transport vehicle in order to identify in good time any risks of collisions, in particular careless individuals, and to avoid these.

With regard to the used 3D scanner, reference is made to the new development of what are known as minilenses, which, in the form of hundreds of minilenses, collect optical information in accordance with the light field principle, the data of which information can then be later combined to form images having a desired resolution and/or a desired viewing angle. Such minilenses are 3D-capable, can be produced economically, and follow the principle of an insect eye.

The WLAN antenna 11 serves for communication with a central control office controlling the transport vehicle.

The goods to be transported 13 constitute a possible load.

Reference sign 14 designates an inductive receiving element for electrical energy. Here, not only can electrical energy be received during travel by the stores arranged in a transport vehicle, but control commands can also be conveyed additionally or in a supplementary manner via the lines installed here in the ground. Instead of inductively effectively laid lines laid fixedly on the ground, certain stations fixed in this respect can also be approached by a transport vehicle. Mobile inductively effective energy transmitters, in the form of mats or plates located on the ground for energy transmission, can also be used.

FIG. 2 shows a side view of the transport vehicle when traveling at an incline. In this illustration the transport vehicle is exposed to a relatively steep gradient of the ground surface. In the case of heavily loaded heavy duty racks, this may lead to an inclination of the heavy duty rack that can no longer be tolerated. Here, not only is the inclination of the heavy duty rack to be taken into consideration on account of the risk of slipping of the load, but it must also be ensured that the center of gravity of the load remains as close as possible to the region of the drive wheels on account of the necessary friction of the drive wheels with the ground surface. In order to correct a tilted position of the heavy duty rack, FIG. 2 therefore shows a possibility for lifting the carrier plate 1 such that the heavy duty rack is raised more in a horizontal direction.

A rear lift rod 16 having an associated actuating element 17 on the rear side of the transport vehicle and a corresponding lift rod 19 having the associated actuating element 18 on the front side are used for this purpose. It can be seen in the side view that the carrier plate 1 is connected to the heavy duty rack via front and rear centering elements 15, which engage with corresponding pyramid-shaped recesses, illustrated in a dashed manner, in the heavy duty rack. An illustration in this respect of the total of four centering elements 15 can be inferred from FIG. 6. The specified actuating elements 17 and 18 can be activated separately, and said activation is independent of the height adjustment of the carrier plate 1 as a whole, described later in FIG. 4.

The left-side drive wheel is designated here by reference sign 20, and the rear stabilizing wheel is designated by reference sign 21.

In order to detect the inclination of the transport vehicle and the heavy duty rack and in order to control the actuating element 17 and 18, a sensor is used, however this has not been designated separately.

Since the transport vehicle according to the invention can cope with the transport of heavy duty racks over inclined planes, it is possible in many cases to dispense with costly lift systems, which are complex in terms of the control thereof.

FIG. 3 shows a side view of the transport vehicle when the ground is uneven. Besides the front stabilizing wheel 9 and the rear stabilizing wheel 21, and also the heavy duty rack 12, particular attention should be paid here to the illustration of the drive wheel 20, which is pivotable about the axis of rotation 5. Since the actuating elements 17 and 18 act in a correcting manner on an inclination of the transport vehicle, they can ensure, even when the ground surface is uneven and there are resultant fluctuations of the heavy duty rack, that the position of the heavy duty rack is quickly corrected. It is thus ensured that the center of gravity of the load on the heavy duty rack always remains in the region of the drive wheels.

FIG. 4 shows a three-dimensional detailed view of the kinematics of the transport vehicle. This image shows the transport vehicle without the enclosing housing 3. Indications of connections to the housing 3 are provided at appropriate points.

The kinematics of the drive wheels will be explained first.

The left-side drive wheel 20 and the axis of rotation 5, known from FIG. 3, can be seen in the foreground. The axle bearing 23 for the left-side drive wheel 20 and the servomotor 22 arranged thereabove are connected to a functional unit by means of a bracket plate, which can only be seen from behind. A toothed belt runs in this bracket plate, via which toothed belt the servomotor 22 drives the axis of rotation of the left-side drive wheel 20. The corresponding servomotor 30 for the right-side drive can be seen on the opposite side. The corresponding bracket plate can be seen on this side from the rear. Here, the corresponding toothed belt 29 running in this bracket plate can be seen. The overall functional unit, consisting of the drive wheel 20 having the axle bearing 23, the servomotor 22 and the bracket plate with its toothed belt, can be pivoted about the axis of rotation 5 via the angle lever 40. The angle lever 40 is secured via the hinge 38 to a U-shaped transverse control arm 34, at the other end of which there is secured accordingly the right-side drive wheel. A spring element 39 is also mounted on the hinge 38, the other bearing point of said spring element being secured to the housing. On the left side of the transport vehicle visible in FIG. 4, this hinging point is shown as a block-shaped bearing, which is hardly visible. By contrast, on the opposite side, this point is designated as the hinging point 45 of the right spring element. The spring element 39 is used to press the drive wheel 20 against the ground surface via the angle lever 40 and thus improve the contact between the drive wheel 20 and the ground. The same is true for the opposite, right drive wheel.

A further kinematic mechanism will be explained hereinafter for lifting a heavy duty rack 12.

In order to be able to receive a heavy duty rack 12, it is necessary for the transport vehicle, after being driven beneath the heavy duty rack 12, to lift said rack and cancel the contact thereof with the ground so as to be able to transport said rack.

The front lift rods 19 and the rear lift rods 16, which are also known from FIG. 2, are used for this purpose in direct contact.

The lift rods 19 and 15 are raised and lowered by means of an actuating element 31, which applies the forces necessary for this by means of a threaded spindle via a retractable and extendable cylinder via a hinge head 28 and a hinged lifting rotary lever 27.

It can be clearly seen in FIG. 4 on the left-hand side how the lifting rotary lever 27 in cooperation with two front lift rod levers 26 causes the necessary changes in position of the two front lift rods 19 by means of corresponding rotary movements about an axis of rotation 25.

The front lift rod levers 19 each carry the corresponding front carrier plate suspension.

At the same time, it can be seen from this area of FIG. 4 that a push rod 24 is hinged to the lifting rotary lever 27 and transfers the movements of the lifting rotary lever 27 via an axis lever 36 to a rear push rod lever 37. The movements of the rear push rod lever 37 lead to the necessary changes in position of the two rear lift rods 16.

The rear lift rod levers 16 each carry the corresponding rear carrier plate suspension 43.

The actuating element 31 is moved via a drive 32 and a force transfer unit 33, which redirects the force. The force transfer unit 33 is secured to the transverse control arm 34 by means of a fork head 35. Since the fork head 35 is mounted rotatably on the transverse control arm 34, the transverse control arm 34 can move as a connection element between the angle levers 40, thus enabling the two drive wheels to perform vertical pivot movements independently of one another. The actuating elements 18 for the front lift rods 19 and the actuating elements 17 for the rear lift rods 16 are characterized in FIG. 4 as blackened regions of the corresponding lift rods. Their function has been explained in FIG. 2.

On the whole, the center of gravity of the load of the heavy duty rack lies directly in the region of the drive wheels as a result of the shown arrangement of the lift rods 16 and 19, the lever arrangement 36, 24, 26, 27 arranged therebetween, and the actuating element 31 in cooperation with the transverse control arm 34, and the influence thereof on the angle lever 40.

The stabilizing wheels 9 and 21 therefore have substantially merely a stabilizing function.

FIG. 5 shows a side view of the illustration of FIG. 4. Here, in FIG. 5a, the transport vehicle is shown with the housing in a side view. So that the functional relationships between the different lever mechanisms can be seen more clearly, the housing is not shown in the illustration in FIG. 5b.

The left drive wheel 20 and the stabilizing wheels 9 and 21 can be seen at a central position. The servomotor 22 and a sensor 42 for detecting the rotary movement of the drive wheel 20 are also shown in this region. The sensor 20 has a corresponding counterpart in the form of a further sensor (not designated) of the right drive wheel. Both sensors can detect not only the speed of rotation of the respective drive wheel, but make it possible to draw conclusions regarding the contact of each of the two wheels with the ground, also in conjunction with the speed of the transport vehicle determined by the control system or further sensors.

The actuating element 31 with its operative connection to the lifting rotary lever 27, the mounting thereof in the axis of rotation 25, and the connection to the front lift rod lever 26 can be seen above the drive wheel 20. The front lift rod 19 having the associated carrier plate suspension 41 and the actuating element 18 can be seen, upright, in the axis of rotation of the lift rod lever 26.

The push rod 24 hinged to the lifting rotary lever 27 leads via the axle lever 36 and the rear lift rod lever 37 to the upright, rear lift rod 16 having its actuating element 17. The rear carrier plate suspension 43 belonging to the lift rod 16 produces the connection to the carrier plate 1. The centering elements 15 on the carrier plate 1 supplement this illustration.

FIG. 6 shows a plan view of the transport vehicle.

The actuating element 31 having the joint head 28 leading to the lifting rotary lever and connection thereof to the push rod 24 can be seen in FIG. 6 in a central position. In this view the left spring element 29, designated here alone, and the servomotor 22 as well as the rear lift rod lever 37 with its carrier plate suspensions 43 can also be seen. All four centering elements 15 in the region of the lift rods 16 and 19 can also be seen at the same time in this illustration from above. Furthermore, installation places (44) for energy stores also find space in the transport vehicle. These may be electrical batteries or other liquid or gaseous energy stores.

The control of the complex movement processes and the signal distribution of the used sensors require a special control program.

LIST OF REFERENCE SIGNS 1 carrier plate, lift plate
2 display
3 housing
4 control element, emergency stop
5 axis of rotation
6 drive wheel
7 covering of the drive wheel
8 plug connection for electrical charging
9 front stabilizing wheel
10 3D scanner (collision protection)
11 WLAN antenna
12 heavy duty rack
13 goods to be transported
14 inductive receiving element for electrical energy
15 centering element
16 rear lift rod
17 actuating element for a rear lift rod
18 actuating element for a front lift rod
19 front lift rod
20 drive wheel, left side
21 rear stabilizing wheel
22 servomotor for left-side drive wheel
23 axle bearing the left-side drive wheel
24 push rod
25 axis of rotation for a front lift rod lever
26 front lift rod lever
27 lifting rotary lever
28 joint head
29 toothed belt for the right-side drive
30 servomotor for the right-side drive
31 actuating element, threaded spindle
32 drive for the actuating element 31
33 force transfer from the drive 32 to the actuating element 31
34 transverse control arm
35 fork head
36 axis lever
37 rear lift rod lever
38 joint for an angle lever 40
39 spring element
40 angle lever
41 front carrier plate suspension
42 sensor for detecting the rotary movement of the left-side drive wheel
43 rear carrier plate suspension
44 installation place for energy store
45 hinging point of the right spring element to the housing 3

The invention claimed is:

1. A device for transporting heavy duty racks on an uneven ground surface by means of a transport vehicle, comprising the following features:
   a) a housing (3) having a carrier plate (1) for carrying and transporting a heavy duty rack (12), having two separately driven drive wheels (20) each hinged to a separate axis of rotation (5), one on each of the two sides in the center of the housing (3), and having at least one stabilizing wheel (9) at the front, and having at least one stabilizing wheel (21) at the rear,
   b) a transverse control arm (34), which connects the drive wheels (20), which each can be pivoted about the axis of rotation (5) by means of an angle lever (40), such that they are able to carry out vertical movements independently of one another,
   c) a centrally arranged actuating element (31), which can move two front lift rods (19) and two rear lift rods (16) by means of a lifting rotary lever (27) and a push rod (24) connected thereto, for raising or lowering the carrier plate (1),
   d) a system for supplying energy to a transport vehicle either via inductive lines laid in the ground or via stationary energy supply stations which can be driven up to,
   e) a control system for controlling and moving a transport vehicle within the scope of a load transportation program.

2. The device as claimed in claim 1, wherein the front lift rods (19) each have an actuating element (18) and the rear lift rods (16) each have an actuating element (17) for separate height adjustment.

3. The device as claimed in claim 1, wherein the center of gravity of the heavy duty rack (12) is detected by means of sensors, and the result of such a center of gravity determination is used in order to control the actuating elements (17) and (18).

4. The device as claimed in claim 1, wherein sensors (42) for detecting the rotary movement of the drive wheels (20)

are provided and can also determine the slip at each drive wheel (20) depending on the speed of the transport vehicle.

5. The device as claimed in claim 1, wherein the inclination of a heavy duty rack (12) is determined by means of an inclination sensor.

6. A method for transporting heavy duty racks on an uneven ground surface by means of a transport vehicle, said method having the following features:
- a) a transport vehicle travels beneath a rack system (12) to be transported and vertically lifts this by means of an actuating element (31) and the push rods (19) and (16), moved directly vertically upwardly as a result of this movement by means of the carrier plate (1), to such an extent that the feet of the heavy duty rack (12) do not contact the ground surface during the transportation, even if the ground is uneven, and moves to the target location,
- b) unevennesses in the ground are compensated for during the transportation to the target location by means of the individually driven drive wheels (20) and the possibility for movement thereof about a decentrally arranged axis of rotation (5), and also the combined movement thereof via the respective angle lever (40) with a transverse control arm (34), such that the transport vehicle is subjected only to minor fluctuations,
- c) in the event of gradients the inclined position of the heavy duty rack is determined by means of an inclination sensor, and the horizontal position of the carrier plate (1) is corrected as necessary by means of actuating elements (17) and (18),
- d) upon arrival at the target location the heavy duty rack (12) is set down at the desired location by means of the lowered push rods (19) and (16).

7. The method as claimed in claim 6, wherein the center of gravity of the heavy duty rack (12) is detected by means of sensors, and the result of such a center of gravity determination is used to control the actuating elements (17) and (18), and in that the inclination of a heavy duty rack (12) is determined by means of an inclination sensor.

8. The method as claimed in claim 6, wherein sensors (42) for detecting the rotary movement of the drive wheels (20) are provided and can also determine the slip at each drive wheel (20) depending on the speed of the transport vehicle.

9. A computer program having a program code for carrying out the method steps as claimed in claim 6 when the program is executed in a computer.

10. A machine-readable carrier containing the program code of a computer program for carrying out the method as claimed in claim 6 when the program is executed in a computer.

* * * * *